United States Patent
Goode

Patent Number: 5,971,888
Date of Patent: Oct. 26, 1999

[54] METHOD AND APPARATUS FOR CONTROLLING ENGINE SPEED DURING POWER TAKE-OFF OPERATION

[75] Inventor: Charles E. Goode, Columbus, Ind.

[73] Assignee: Cummins Engine Company, Inc., Columbus, Ind.

[21] Appl. No.: 09/033,520

[22] Filed: Mar. 2, 1998

[51] Int. Cl.$^6$ ................................................. B60K 41/04
[52] U.S. Cl. .............................. 477/107; 477/111; 74/11; 74/15.66; 74/15.63; 180/53.31; 180/179
[58] Field of Search ..................................... 477/107, 108, 477/111, 36; 74/11, 15.2; 180/53.1, 170, 179

[56] References Cited

U.S. PATENT DOCUMENTS

| | | | |
|---|---|---|---|
| 4,372,265 | 2/1983 | Kasiewicz | 180/179 X |
| 4,401,075 | 8/1983 | O'Keefe, Jr. et al. | 180/170 X |
| 4,422,420 | 12/1983 | Cromas | 180/179 X |
| 4,585,356 | 4/1986 | Hudelmaier | 74/15.66 X |
| 4,618,016 | 10/1986 | Van Der Lely | 74/11 X |
| 4,658,943 | 4/1987 | Nishikawa et al. | 180/53.1 X |
| 4,856,355 | 8/1989 | Ishimaru | 74/11 |
| 5,237,883 | 8/1993 | Churchill et al. | 74/11 |
| 5,562,173 | 10/1996 | Olson | 180/53.1 X |
| 5,563,547 | 10/1996 | Blanchard et al. | 327/484 |
| 5,592,029 | 1/1997 | Hollstein et al. | 307/9.1 |
| 5,611,751 | 3/1997 | Ehrenhardt et al. | 477/107 X |

*Primary Examiner*—Rodney H. Bonck
*Assistant Examiner*—Ankur Parekh
*Attorney, Agent, or Firm*—Beck, Michael & Beck, P.C.

[57] ABSTRACT

A method and apparatus for controlling engine speed during power take-off (PTO) operation. A technique is disclosed which enables accelerator pedal over-ride of PTO operation, wherein PTO operation is resumed when the accelerator pedal induced engine speed value decreases to a preset PTO engine speed. Also, a high-speed governor is employed to limit accelerator pedal-based engine speed during PTO over-ride operation to thereby limit maximum engine speed. In accordance with the invention, the operator of a vehicle can thus accelerate the engine, via actuation of the accelerator pedal, to engine speeds in excess of the preset PTO engine speed without disengaging PTO operation.

13 Claims, 3 Drawing Sheets

METHOD AND APPARATUS FOR CONTROLLING ENGINE SPEED DURING POWER TAKE-OFF OPERATION

FIELD OF THE INVENTION

The present invention relates generally to power take-off devices, and more specifically to techniques for controlling engine speed during power take-off operation.

BACKGROUND OF THE INVENTION

Power take-off devices are well known in the heavy-duty, commercial and industrial truck and equipment industries. Power take-off (PTO) devices are used to run various pieces of auxiliary and accessory equipment that maybe attached to such vehicles and equipment, and/or the vehicle and equipment themselves. Typically, the engine associated with the vehicle is used to drive the vehicle and/or the auxiliary equipment when the PTO is enabled and engaged.

One example of a specific use of PTO devices is with refuse collection vehicles. When the PTO is engaged, the operator of the vehicle can compact loose refuse placed therein using the PTO device, which uses engine power to operate a compacting device. Another specific example of the use of PTO devices is with concrete delivery vehicles. The PTO uses the power from the engine to operate the mixing drum as the vehicle transports the concrete to the job site and further to dispense the concrete upon reaching the job site. In either case, the engine used to drive the PTO device may additionally or alternatively be used to drive the vehicle itself. Many other types of vehicles and equipment use PTO devices as well, such as dump trucks, agricultural tractors and construction equipment, to name a few. PTO devices may be used to provide power to such items as pumps, lifts, blowers, and other mechanisms known to those in the commercial and heavy-duty equipment industries.

Typically, the engine speed regulates the speed of the PTO operation while the PTO is engaged. As one specific example of such a system, a pair of operator switches may be used to control PTO operation: 1) a first switch, typically an ON/OFF switch, is used to enable and disable PTO operation; and 2) a second switch, typically a "SET/RESUME" switch, is operable in the SET position to set PTO speed to a first engine speed, and in the RESUME position to set PTO speed to a second engine speed. In PTO operations involving a moving vehicle, the PTO operation is typically limited to calibratable engine speeds, such as 1000 rpm to 1200 rpm. This is due to the operating speed limitations of many PTO devices. In vehicles having a cruise control system, the ON/OFF and SET/RESUME switches used for PTO operation are the same switches provided in known cruise control systems. However, many engines/vehicles operable to drive one or more PTO devices do not include cruise control systems therein, and in the general case the ON/OFF and SET/RESUME switches may be any operator controlled switches.

When PTO operation involves a moving vehicle, many problems may arise involving control of the vehicle speed while the PTO is engaged. For example, it is known in the art for the PTO to disengage when the operator presses a brake or vehicle clutch. U.S. Pat. No. 5,611,751 to Ehrenhardt et al. discloses a PTO control system in which vehicle speed may be controlled by the brake or clutch while the PTO remains engaged.

Another common feature of PTO systems is for the PTO to disengage upon deflection of the accelerator pedal. Alternatively, the engine may be unresponsive to manual manipulation of the accelerator pedal while PTO is engaged. Each of these features are designed primarily to protect the PTO device from being run or engaged at too high of a speed, i.e. in excess of the speed limitations of the PTO device. Unfortunately, these features also cause the PTO to disengage under conditions in which it would be advantageous to have accelerator pedal control of engine speed. Increased engine speeds are not always harmful to the PTO apparatus, such as increasing engine speed for only a short duration, and the PTO device is performing work below its design limitations.

PTO device operators typically bypass the above described PTO control mechanisms by manually disengaging PTO operation using the ON/OFF switch in order to accelerate the engine. However, to resume the PTO set speed, the operator is required to re-engage PTO operation when it is again needed. Thus, known PTO systems suffer the drawback that the operator is required to continuously manually manipulate the PTO ON/OFF switch in order to accelerate the engine. This activity may divert the operator's attention away from the safe operation of the vehicle/engine and other duties the operator might be required to perform.

What is needed, therefore, is a PTO control system that allows engine speed to be easily controlled by accelerator pedal activity while the PTO is engaged, i.e. a PTO control system that allows accelerator pedal over-ride of PTO operation to thereby increase engine speed, yet resumes the previously set PTO speed as the engine speed decreases thereto. The system should be reliable and simple to operate, and should be able to be readily integrated into an existing control system. Finally, the system should allow the vehicle to be operated safely in conjunction with the PTO operation.

SUMMARY OF THE INVENTION

The present invention addresses the foregoing shortcomings of the prior art PTO devices. In accordance with one aspect of the present invention, a technique is provided for controlling power take-off operation of an internal combustion engine, the engine having an associated accelerator pedal responsive to actuation thereof to fuel the engine. The technique comprises the steps of (a) determining a power take-off operation status and a first engine fueling requirement corresponding thereto; (b) determining a position of an accelerator pedal and a second engine fueling requirement corresponding thereto; (c) selecting a maximum of the first and second engine fueling requirements; and (d) controlling engine fueling according to the maximum of the first and second engine fueling requirements.

In an alternate form, the technique additionally includes comparing the maximum of the first and second engine fueling requirements to a high-speed governor fueling requirement and selecting a minimum thereof.

In another aspect of the invention, an apparatus for controlling a vehicle speed system of a vehicle driven by a power take-off of an internal combustion engine is disclosed. The apparatus includes an accelerator pedal producing an accelerator pedal signal corresponding to accelerator pedal deflection; a fuel system coupled to an internal combustion engine and responsive to a fuel system control signal to supply fuel to the engine; a power take-off control assembly including a first switch having at least a first switch position producing a power take-off signal corresponding to power take-off operation at a first engine speed; a control computer receiving the accelerator pedal signal and the power take-off signal, the control computer comparing the accelerator pedal signal with the power take-off signal and providing a fuel control signal to the fuel system corresponding to a maximum of the accelerator pedal and power take-off signals.

In one alternate form, the first switch includes a second switch position producing a second power take-off signal. The second power take-off signal corresponds to power take-off operation at a second engine speed.

In yet another aspect of the present invention, the power take-off control assembly includes a second switch. The second switch includes an on position for enabling power take-off operation and an off position for disabling power take-off operation. The first switch is preferably a SET/RESUME switch and the second switch an ON/OFF switch.

An additional aspect of the present invention includes a high-speed governor-fueling requirement. The control computer compares the signal corresponding to the maximum fueling requirement of the accelerator pedal and power take-off signals to a signal corresponding to the high-speed governor fueling requirement. The control computer provides a fuel system control signal corresponding to the minimum thereof.

One object of the present invention is to provide a technique for allowing acceleration and control of an engine via its accelerator pedal while the engine is engaged in PTO operation.

Another object of the present invention is to provide a technique for controlling PTO operation that is able to be readily integrated into existing control systems.

It is yet another object to reduce the time and number of tasks involved in operating a vehicle while the PTO is engaged.

Another object is to make the operation of vehicles safer when the PTO operation is engaged.

These and other objects will become more apparent from the following description of the preferred embodiment.

DESCRIPTION OF THE PREFERRED EMBODIMENT

Figure 1:
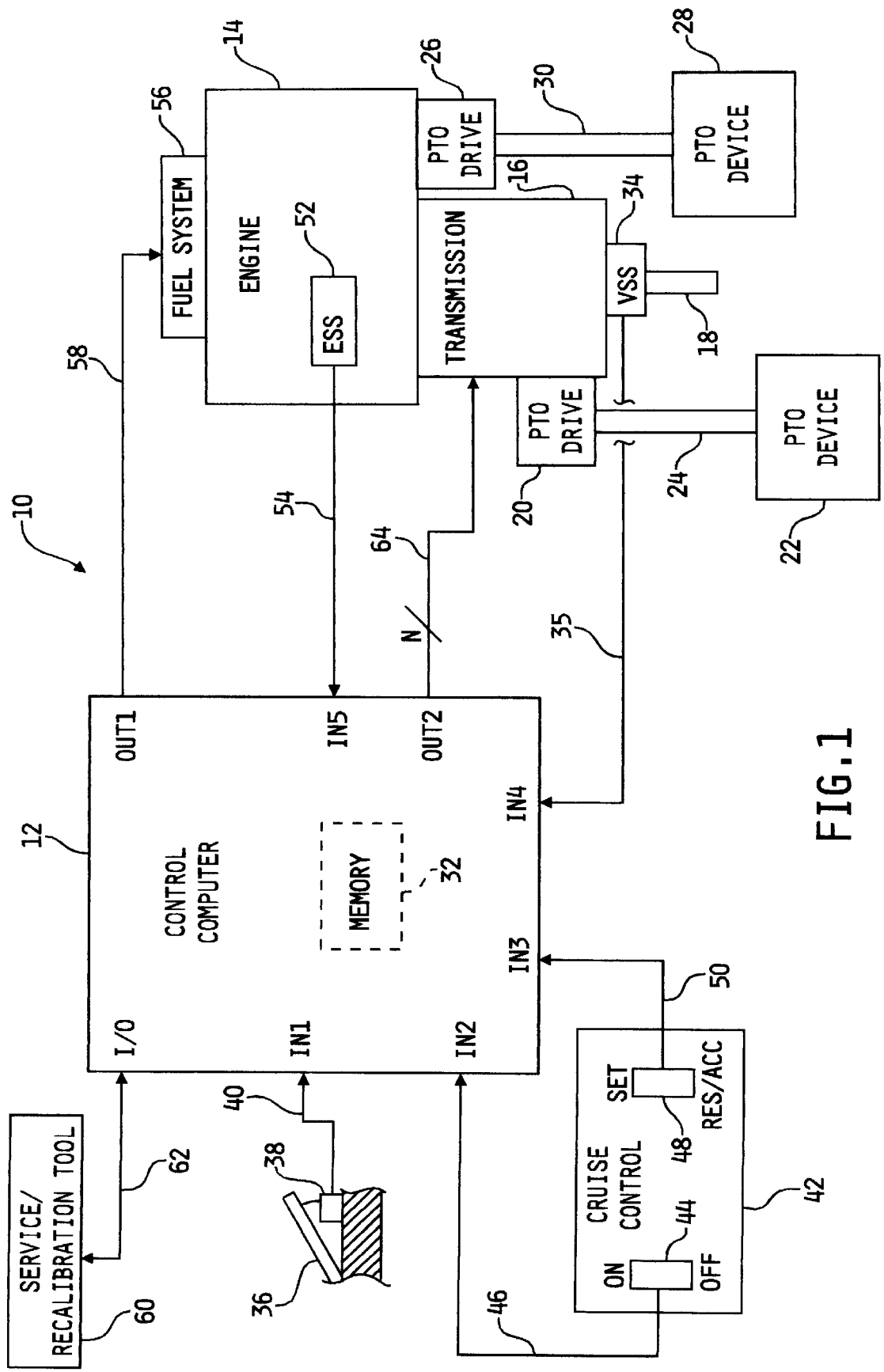
FIG. 1 is a block diagram illustration of one preferred embodiment of an engine/vehicle PTO control system in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, one preferred embodiment of a vehicle/engine control system 10 for carrying out the principles of the present invention is illustrated. Control system 10 includes a control computer 12, which is operable to control an engine 14, and a transmission 16 connected thereto as is known in the art. Transmission 16 is connected to a propeller shaft or tailshaft 18, which is used to drive a vehicle as is known in the art. A power take-off (hereinafter referred to as "PTO") drive unit 20 is connected to transmission 16, as is known in the art, and to a PTO device 22 via propeller shaft 24. A second known PTO drive unit 26 is connected to engine 14, as is known in the art, and to a PTO device 28 via propeller shaft 30. It is to be understood that system 10 may include either one, or both of, the PTO drive units 20 and 26 and associated PTO elements. Examples of PTO devices which may comprise PTO device 22 and/or 28 include, but are not limited to, pumps, lifts, blowers, and the like.

Control computer 12 is often referred to as an engine control module (ECM), engine control unit (ECU), or the like, is preferably microprocessor-based, and includes a memory unit 32. Control computer 12 is operable, as is well known in the art, to control and manage many engine and vehicle operations in accordance with software algorithms and operational data typically stored within memory unit 32.

Many engine/vehicle sensors, switches and other vehicle/engine components interface with control computer 12 during the operation thereof, and some examples of such components, as they relate to the present invention, are illustrated in FIG. 1. For example, control system 10 includes a vehicle speed sensor (VSS) 34 electrically connected to an input IN4 of control computer 12 via signal path 35. Vehicle speed sensor 34 is operable to sense vehicle speed and provide a vehicle speed signal corresponding thereto on signal path 35. In one embodiment, vehicle speed sensor 34 is a variable reluctance sensor positioned about tailshaft 18 adjacent to the transmission 16, although sensor 34 may be positioned at any suitable vehicle location and may be any known sensor or sensing system operable to determine vehicle speed and provide a corresponding vehicle speed signal.

Control system 10 further includes an accelerator pedal 36 having a pedal position sensor 38 associated therewith which is electrically connected to input IN1 of control computer 12 via signal path 40. Pedal position sensor 38 is responsive to the position or percentage deflection of accelerator pedal 36 to provide an accelerator pedal position signal to control computer 12 via input IN1. In one embodiment, the accelerator pedal position sensor 38 is a potentiometer connected at one end to a suitable voltage (such as 5 or 12 volts) and at an opposite end to ground potential. The wiper of such a potentiometer is mechanically coupled to the accelerator pedal 36, as is known in the art, and is electrically connected to signal path 40 so that the voltage present on signal path 40 is directly proportional to the position or percentage deflection of accelerator pedal 36. Those skilled in the art will, however, appreciate that other known accelerator pedal position sensors may be used to provide the accelerator pedal position signal to control computer 12. Examples of such components include, but are not limited to, pressure sensors, magnetic or hall effect sensors and the like.

Control system 10 further includes a pair of switches 44 and 48 for controlling PTO operation. The first switch 44, preferably an ON/OFF switch, is connected to input IN2 of control computer 12 via signal path 46, and the second switch 48, preferably a SET and RESUME/ACCELERATE switch, is connected to input IN3 of control computer 12 via signal path 50. It is to be understood that switches 44 and 48 may be any operator controlled switches provided on a control panel 42 or other structure, wherein such switches are operable as described hereinafter, although in one embodiment control panel 42 preferably comprises a cruise control unit operable as is known in the art to provide control computer 12 with signals corresponding to desired road speed. Cruise control unit 42 includes an ON/OFF switch 46 for enabling/disabling cruise control operation, as is known in the art, and a SET, RESUME/ACCELERATE switch 48 for controlling cruise set speed and well known vehicle speed resume and accelerate features. Preferably, PTO operation is enabled when the cruise control ON/OFF switch 44 is set in the OFF position and at vehicle speeds less than a predefined engine speed (e.g. 30 mph), so that the SET, RES/ACCEL switch may be used to set a desired engine speed for PTO operation. In one preferred embodiment, actuating switch 48 in the SET position presets the engine speed in PTO operation to a first engine speed (e.g. 1000 RPM), and in the RES/ACCEL position presets the engine speed to a second engine speed (e.g. 1200 RPM). It is to be understood, however, that the PTO set point engine speeds may be programmed to any desired speed, typically via a known service/recalibration tool 60 connected to an I/O port of control computer 12 via signal path 62, and the above example speeds are provided only as an example. In any case, the ON/OFF switch 44 is preferably a known single pole, single throw switch and the SET, RES/ACCEL switch 48 is preferably a known center-off switch having at least a SET position and a RES/ACCEL position.

The engine 14 is preferably an internal combustion engine and includes an engine speed sensor 52 associated therewith which is electrically connected to input IN5 of control computer 12 via signal path 54. The engine speed sensor (ESS) 52 is operable to sense engine rotational speed (typically in RPM) and/or engine position (typically in degrees relative to TDC), and provide an engine speed signal corresponding thereto on signal path 54. In one embodiment, engine speed sensor 52 is a HALL effect sensor responsive to passage thereby of a number of teeth of a gear or wheel rotating in synchronism with engine 14, to provide the engine speed signal on signal path 54. Those skilled in the art will, however, appreciate that engine speed sensor 52 may alternatively be a variable reluctance or other known sensor operable to sense engine speed and/or position and provide a corresponding engine speed signal to control computer 12.

Control computer 12 also includes a first output OUT1 electrically connected to a fuel system 56, associated with the engine 14, via signal path 58. Fuel system 56 may be any known fuel system including one or more fuel injectors, etc., and is responsive to one or more fuel control signals provided thereto by control computer 12 on signal path 58 to fuel the engine 14 accordingly.

The control computer 12 determines the one or more fuel control signals as the result of at least operational information delivered by engine speed sensor 52, vehicle speed sensor 34, cruise control unit 42, and/or accelerator pedal position sensor 38, for example. In one aspect of the present invention, the one or more fuel control signals are a function of pre-programmed instructions in memory 32, and are determined specifically in accordance with the position of accelerator pedal 36 corresponding to a set of those instructions. In another embodiment, one or more fuel control signals are determined in accordance with other PTO operational inputs and instructions stored in memory 32 corresponding thereto as is known in the art. For example, if PTO operation is enabled and engaged via the SET position of multifunction switch 48, a first fuel command corresponding to a first desired engine speed is calculated and computer 12 provides a fueling control signal corresponding thereto on signal path 58. Alternatively, if PTO operation is engaged via the RESUME position of multifunction switch 48, a second fuel command corresponding to a second desired engine speed is calculated and computer 12 provides a fueling control signal corresponding thereto on signal path 58.

Transmission 16 may be a manual transmission, an automatic transmission, or manual-automatic transmission, as known in the art. Transmission 16 may include a transmission control unit (not shown) having a number of electrical signal inputs connected to an output port OUT2 of control computer 12 via a number N, of signal paths 64, wherein N may be any integer. The control computer 12 controls automatic shifting between gear ratios of transmission 16 via signal path 64 as is known in the art.

Figure 2:
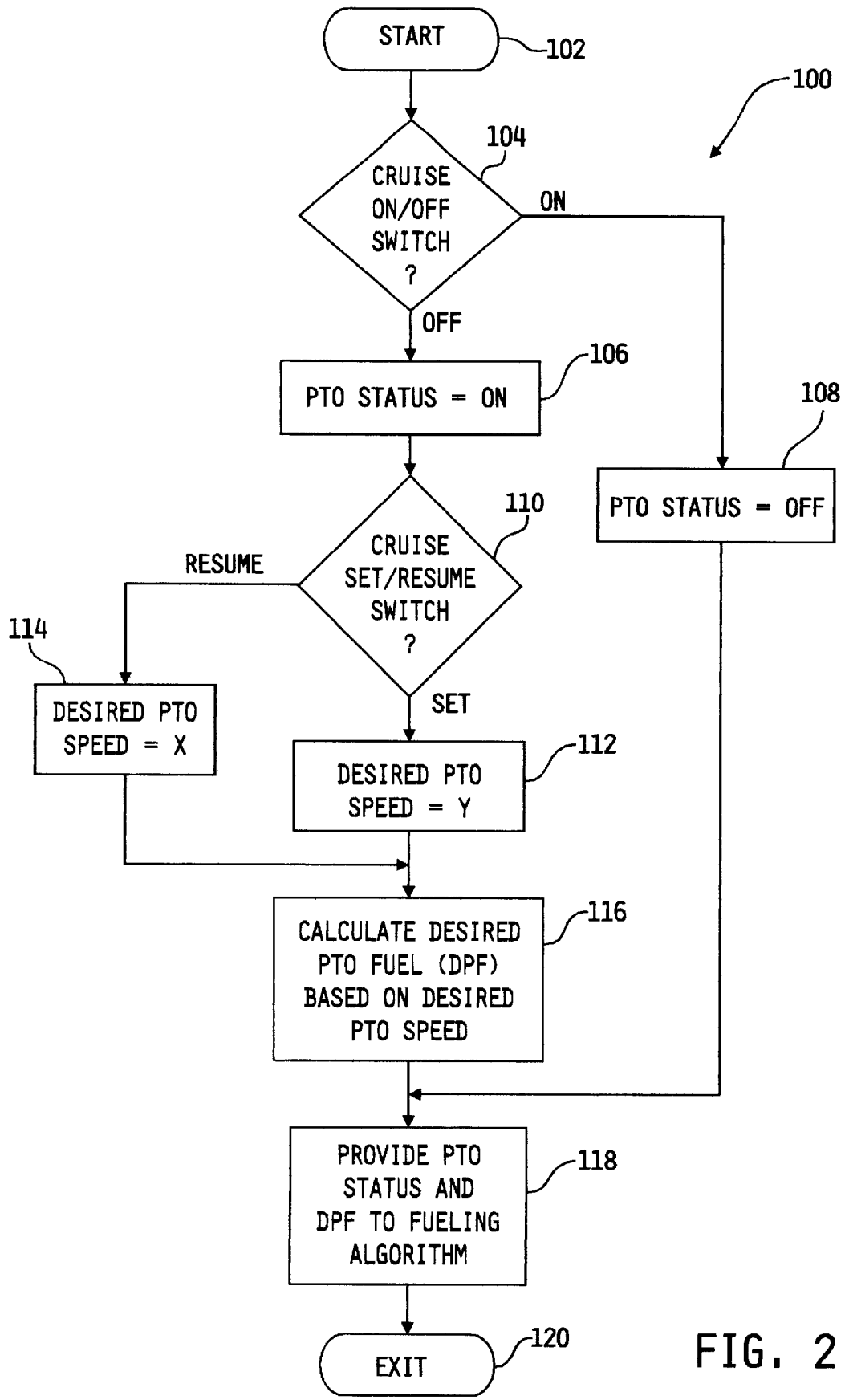
FIG. 2 is a flowchart illustrating one preferred embodiment of a software algorithm for determining PTO status and PTO set speed, according to the present invention.

Referring now to FIG. 2, there is illustrated an algorithm, designated generally at 100, for determining PTO operational status and fueling requirements in accordance with one aspect of the present invention. Algorithm 100 is executable by control computer 12 or by an auxiliary computer connected thereto. The algorithm 100 starts at step 102, and at step 104 control computer tests the status of the ON/OFF switch 44, which is a cruise control ON/OFF switch in one embodiment. Those skilled in the art will, however, recognize that other suitable switches may be used as switches 44 and 48 without detracting from the concepts of the present invention. In any case, if the cruise control switch is ON, algorithm execution continues at step 108 where control computer 12 sets a PTO status flag to OFF. Algorithm execution continues from step 108 at step 118. If, on the other hand, control computer 12 determines at step 104 that the cruise ON/OFF switch is in the OFF position, algorithm execution continues at step 106 where control computer 12 sets the PTO status flag to ON. Algorithm execution continues from step 106 at step 110.

At step 110, control computer monitors the SET/RESUME switch 48, preferably a cruise control SET/RESUME switch, and branches to step 114 if the RESUME feature of switch 48 has been activated. At step 114, computer 12 sets a desired PTO engine speed variable to a first engine speed X (e.g. 1000 RPM), and algorithm execution continues therefrom at step 116. If, on the other hand, computer 12 determines at step 110 that the SET feature of switch 48 has been activated, algorithm execution branches to step 112 where computer 12 set the desired PTO engine speed variable to a second engine speed Y which is preferably higher than engine speed X (e.g. 1200 RPM). Thereafter, algorithm execution continues at step 116.

At step 116, control computer 12 calculates a desired PTO fuel (DPF) value based at least in part on the value of the desired PTO engine speed variable. Thereafter at step 118, control computer 12 provides the PTO status information and DPF information to a fueling algorithm such as that illustrated in FIG. 3. From step 118, algorithm continues to step 120 where algorithm 100 is returned to its calling routine. Alternatively, step 118 may loop back to step 104 for re-execution of algorithm 100.

Figure 3:
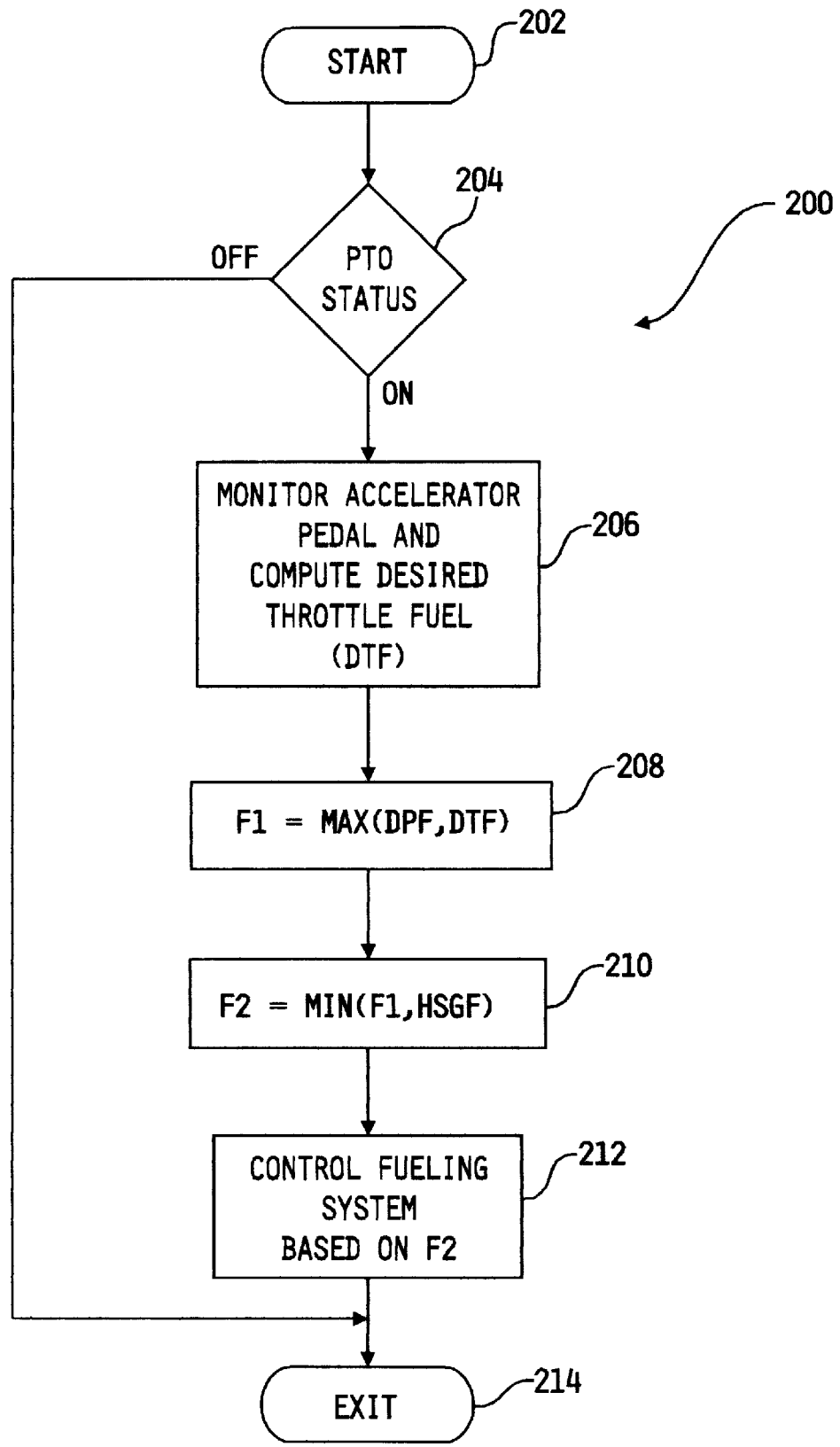
FIG. 3 is a flowchart illustrating one preferred embodiment of a software algorithm for determining engine fueling as a function of PTO set speed and accelerator pedal activity, according to the present invention.

Referring now to FIG. 3, one preferred embodiment of a software algorithm 200 for determining engine fueling as a function of PTO set speed and accelerator pedal activity, according to the present invention, is shown. Algorithm 200 starts at step 202, and at step 204, control computer 12 checks the PTO status flag to determine PTO operational status. If PTO is OFF, algorithm execution continues at step 214 where algorithm 200 is returned to its calling routine. If, at step 204, control computer 12 determines from the PTO status flag that PTO is ON, algorithm execution continues at step 206 where control computer 12 is operable to monitor activity of the accelerator pedal 36 and compute a desired throttle fuel value (DRF) based, at least in part, on accelerator pedal position or deflection percentage. Preferably, control computer 12 accomplishes step 206 by receiving an accelerator pedal signal indicative of the position or deflection percentage of accelerator pedal 36, and processing this signal along with other engine operational parameters to determine the DTF value as is known in the art. Algorithm execution continues from step 206 at step 208.

At step 208, control computer 12 is operable to compute a first fueling value F1 as a maximum of the desired PTO fueling value DPF and the desired throttle fuel value DTF. In this manner, the higher engine speed value will result and PTO operation can accordingly be over-ridden by sufficient accelerator pedal 36 deflection. Algorithm execution continues from step 208 at step 210 where control computer 12 is further preferably operable to compute a second fueling value F2 as a minimum of the first fueling value F1 and a predefined value of a so-called high speed governor fueling (HSGF) variable, which variable corresponds to a maximum allowable engine speed. Those skilled in the art will recognize that step 210 may be optionally included as a safety precaution to limit maximum engine speed to the high side governor value. The HSGF value will not likely limit engine speed during PTO control since both of the desired engine speed values X and Y (steps 114 and 112 of algorithm 100) will typically be programmed to engine speeds much less than maximum governed engine speed. Rather, the HSGF value will become important during accelerator pedal override of PTO operation wherein the driver has manual control over the pedal 36. In order to protect the engine and its components from possible damage, the HSGF value effectively establishes a maximum engine speed during accelerator pedal over-ride, wherein the HSGF value may be programmed via the service/recalibration tool 60.

Algorithm execution continues from step 212 at step 214 where control computer 12 is operable to process the fueling value F2 and provide a fueling signal at output OUT1 corresponding thereto. Fuel system 56 is, in turn, responsive to this fueling signal to provide engine 14 with the desired fueling as is known in the art. Algorithm execution continues from step 212 at step 214 where algorithm 200 is returned to its calling routine. Alternatively, step 212 could loop back to step 204 for repeated execution of algorithm 200.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected.

What is claimed is:

1. A method of controlling engine speed during power take-off operation of an internal combustion engine, comprising the steps of:
   (a) determining a first engine-fueling requirement corresponding to power take-off operation;
   (b) determining a position of an accelerator pedal and a second engine-fueling requirement corresponding thereto;
   (c) continually monitoring and comparing said first and second engine fueling requirements and selecting a maximum thereof; and
   (d) controlling engine fueling according to the maximum of the first and second engine fueling requirements without discontinuing said power take-off operation.

2. The method of claim 1, wherein step (c) additionally includes comparing said maximum of the first and second engine fueling requirements to a high-speed governor fueling requirement and selecting a minimum thereof.

3. An apparatus for controlling speed of an internal combustion engine driving a power take-off device comprising:
   a power take-off device driven by an internal combustion engine;
   an accelerator pedal producing an accelerator pedal signal corresponding to accelerator pedal deflection;
   a fuel system coupled to said internal combustion engine and responsive to a fuel control signal to supply fuel thereto;
   a power take-off control assembly including a first switch having at least a first switch position producing a power take-off signal corresponding to power take-off operation at a first engine speed; and
   a control computer receiving said accelerator pedal signal and said power take-off signal, said control computer continually comparing said accelerator pedal signal with said power take-off signal and providing a fuel control signal to said fuel system corresponding to a maximum of said accelerator pedal and power take-off signals, said comparing and providing steps being performed without discontinuing drive between said engine and said power take-off device.

4. The apparatus of claim 3, wherein said first switch includes a second switch position producing a second power take-off signal, said second power take-off signal corresponding to power take-off operation at a second engine speed.

5. The apparatus of claim 4, wherein said power take-off control assembly includes a second switch, said second switch including a first position for enabling power take-off operation and a second position for disabling power take-off operation.

6. The apparatus of claim 5, wherein said first switch and said second switch comprise a portion of a cruise control unit.

7. The apparatus of claim 3, wherein said control computer includes a high-speed governor fueling requirement, said control computer comparing said maximum fueling requirement of said accelerator pedal and power take-off signals to a signal corresponding to said high-speed governor fueling requirement, and providing a fuel control signal corresponding to a minimum thereof.

8. The apparatus of claim 3, further including a power take off (PTO) drive unit coupled to said internal combustion engine, said internal combustion engine driving said PTO drive unit.

9. The apparatus of claim 8 further including a PTO device coupled to, and driven by, said PTO drive unit.

10. The apparatus of claim 3 further including:
    a transmission coupled to said internal combustion engine; and
    a power take off (PTO) drive unit coupled to said transmission, said transmission driving said PTO drive unit.

11. The apparatus of claim 10 further including a PTO device coupled to, and driven by, said PTO drive unit.

12. The apparatus of claim 3, wherein said first switch comprises a portion of a cruise control unit.

13. The apparatus of claim 12, wherein said first switch is a SET/RESUME switch.

* * * * *